Patented Feb. 1, 1927.

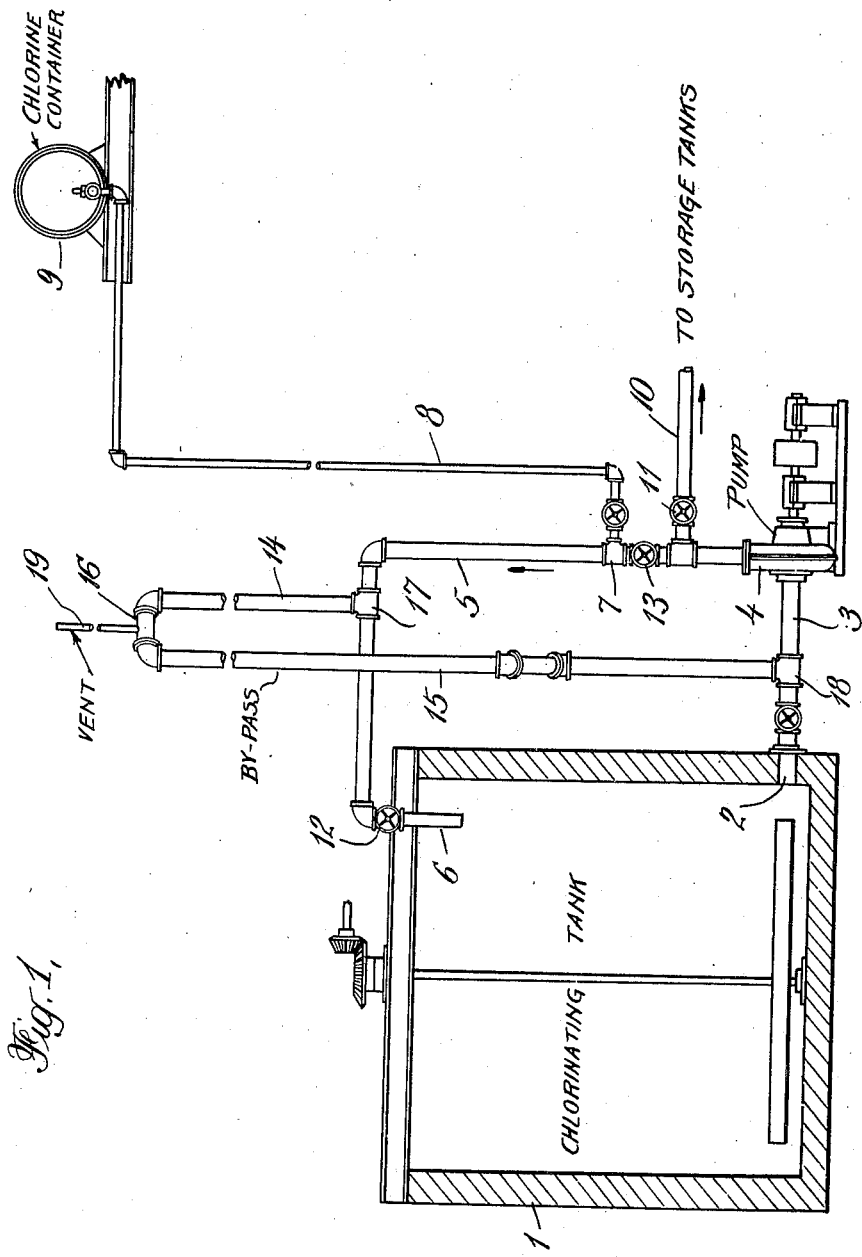

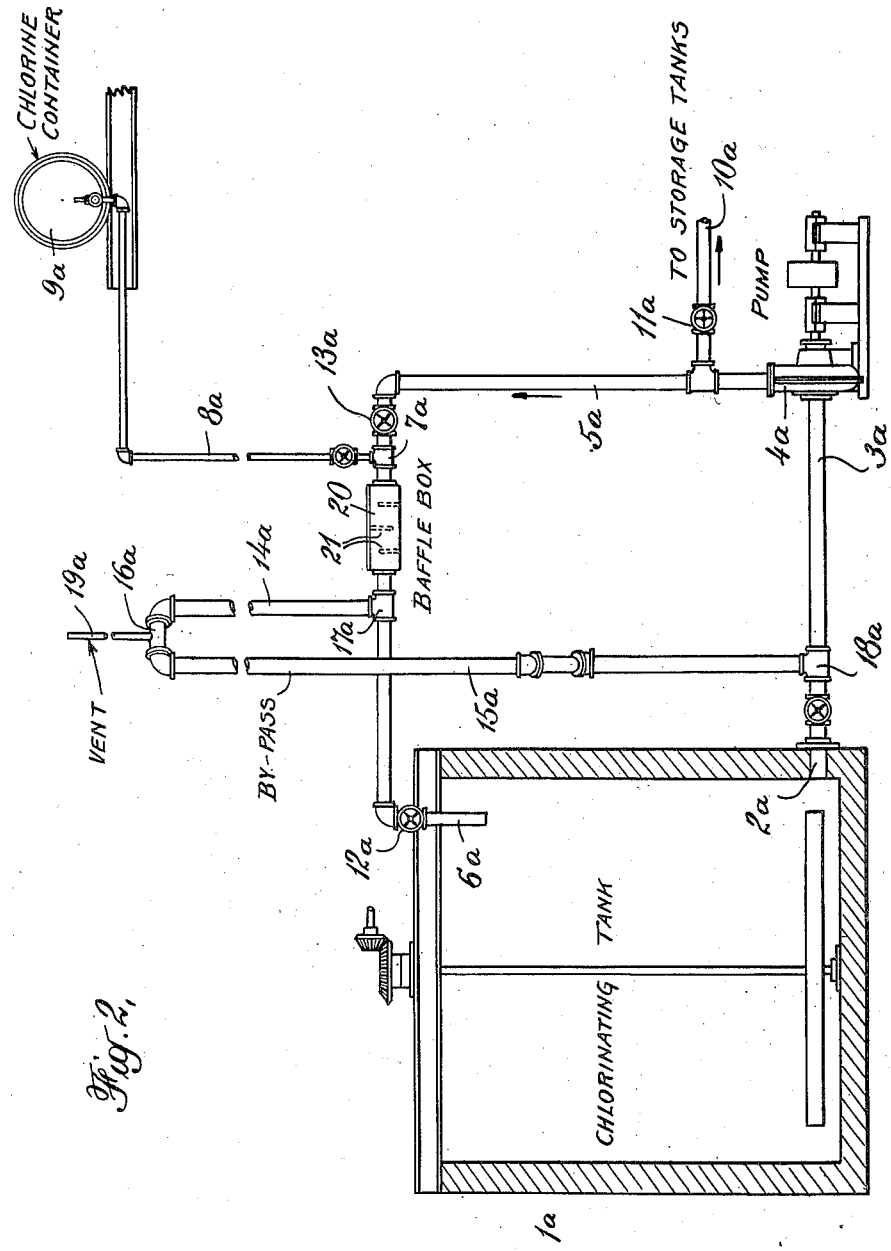

1,616,134

UNITED STATES PATENT OFFICE.

JAMES H. MacMAHON, OF NIAGARA FALLS, NEW YORK, ASSIGNOR TO THE MATHIESON ALKALI WORKS, INC., OF NEW YORK, N. Y., A CORPORATION OF VIRGINIA.

METHOD OF CHLORINATING SOLUTIONS.

Application filed July 9, 1925. Serial No. 42,621.

This invention relates to improvements in the chlorination of liquids, and relates more particularly to improvements in the chlorination of alkaline solutions such as milk of lime for the production of bleach liquors and the like. The invention includes improvements in method and in apparatus.

Chlorine, as usually employed in the preparation of bleach liquors and the like, is distributed to the consumer as a liquid in steel containers under pressure. I have found, as described in Patent No. 1,426,752 granted to The Mathieson Alkali Works, August 22, 1922, on my application filed March 4, 1922, that the liquid chlorine may with advantage be introduced directly into the liquid to be chlorinated. I have also found that for the rapid chlorination of large volumes of liquid it is advantageous to maintain a circulating stream of the liquid and to mingle the chlorine with the circulating stream, as described in the said patent. This circulation may be maintained by a pump. Where chlorine in the liquid state or partly in the liquid state is introduced into the liquid entering the intake side of such a circulating pump certain advantages, such as the distributing action of the pump, are secured, but the operation nevertheless imposes severe mechanical strains on the pump due to the vaporization of liquid chlorine therein.

I have now found that chlorine, in the liquid state or partly in the liquid state, may with advantage be introduced into the liquid to be chlorinated on the discharge side of a circulating pump. This avoids mechanical difficulties due to vaporization of liquid chlorine in the pump. Further, however, it secures the surprising result of enabling the rate at which chlorine is introduced to be substantially increased, for example as much as twofold or more, as compared to operations otherwise similar except in that the chlorine is introduced on the intake side of the pump. Thus, according to my present invention, a stream of the liquid to be chlorinated is circulated through suitable connections by means of the circulating pump and the chlorine is introduced into the circulating connections on the discharge side of the pump.

The increased rate at which chlorine can be introduced in carrying out the present invention is apparently due to several factors. By avoiding vaporization of chlorine within the pump mechanical strains on the pump due to this cause are eliminated and the efficiency of the pump is correspondingly increased, while by introducing the chlorine on the discharge side of the pump the circulation of gaseous chlorine through the pump is avoided increasing the effective capacity of the pump in circulating the liquid to be chlorinated. The rate of chlorine absorption, and consequently the rate at which the chlorine can be introduced, is thus increased by the improved circulation provided. The increased pressure prevailing on the discharge side of the pump also promotes the solubility of the chlorine as it is introduced and apparently assists in increasing the rate of chlorine absorption by facilitating the initial absorption of chlorine in the liquid to be chlorinated. My invention, however, is not predicated upon this explanation of the improved results secured.

The chlorine may be supplied as a liquid from the usual containers and the pressure of the chlorine in the containers may be employed to effect the discharge of the chlorine into the circulating liquid to be chlorinated. The introduction of the chlorine into the circulating connections on the discharge side of the pump may be effected in several ways. For example, the discharge connections from the circulating pump may be of sufficient length to provide for complete absorption of the chlorine or they may be arranged to confine unabsorbed chlorine to the liquid undergoing chlorination. The absorption of the chlorine may also be promoted by providing for the maintenance of an increased pressure in the discharge connections. For example, a valve may be arranged in the discharge connections and this valve may be regulated to control the flow therethrough to obtain the desired pressure between the circulating pump and the valve and the chlorine may be introduced into the circulating connections between the circulating pump and this valve. It is sometimes more advantageous to provide for circulation of the liquid to be chlorinated upwardly through appropriate connections to an elevated point and to introduce the chlorine into the circulating liquid at the lower end of this circulating stream so that the pressure of the liquid column is available to promote the chlorination. The rate of chlorine absorption may also be promoted by providing a baffle box or other agitating means in the discharge connections beyond the point at which chlorine is introduced.

Where, as in carrying out the present invention, chlorine is introduced into the circulating liquid on the discharge side of a pump, any obstruction of the circulating connections beyond the point of chlorine introduction while the pump is in operation tends to increase the pressure therein which increase in pressure may force the liquid being chlorinated in a reverse direction of flow through the chlorine connections to the chlorine container. Such obstruction may be due to irregularity in the chlorination operation or to improper control by the operator, or it may be due to the maintenance of an increased pressure in the discharge connections for promoting the absorption of chlorine. Dry chlorine does not attack the steel containers which are usually employed, but where aqueous solutions, for example, reacting with the chlorine find their way into such containers they have a severely destructive effect. Check valves in the chlorine connections, a somewhat obvious expedient, are not entirely reliable as the same corrosive action which they are designed to prevent frequently makes them useless for the purpose.

To avoid difficulties and dangers of this nature, my invention includes an improved apparatus for chlorinating liquids such as milk of lime and the like in accordance with the method of this invention. In the improved apparatus of the invention, automatic means are provided to prevent the development of any excess pressure in the discharge connections which might tend to cause reverse flow of the liquid being chlorinated through the connections for introducing chlorine. This makes it possible to employ the pressure of the chlorine in the container to effect the discharge of the chlorine into the liquid to be chlorinated without danger of the liquid being chlorinated finding its way into the chlorine containers, and also makes it possible to employ the pump used in the chlorination operation for pumping the chlorinated liquid to a place of storage or use without danger of the development of excessive pressures in the discharge line.

One particularly advantageous means for automatically preventing the development of excess pressures in the discharge connections from the pump is a by-pass arranged between the discharge and intake connections of the pump to have a flow resistance in excess of the normal flow resistance through the discharge connections but sufficiently low to permit circulation therethrough before excessive pressures develop in the discharge connection. By providing such a by-pass, and by eliminating any obstruction between the point of introduction of chlorine and the intake side of the pump through the by-pass connection, any tendency for the pump to force the liquid being chlorinated through the chlorine connections in a reverse direction is avoided as circulation through the by-pass relieving the pressure will take place before sufficient pressure can be developed in the discharge connections while at the same time this by-pass, due to its greater flow resistance, is normally inoperative, the circulating liquid and the introduced chlorine being discharged through the normal discharge connections.

The invention will be further described in connection with the accompanying drawings which illustrate diagrammatically, in elevation and partly in section, an apparatus embodying the invention and adapted for operation in accordance with the invention, but it will be understood that this more detailed description and illustration are for the purpose of exemplification and that the invention is not limited thereto. In the accompanying drawings:

Fig. 1 represents one form of apparatus embodying the invention and adapted for the practice of the invention, and Fig. 2 represents a modified form of apparatus.

Referring to Fig. 1, a body of the liquid to be chlorinated, for example an alkaline solution such as milk of lime, is maintained in the chlorinating tank 1 and a stream of this liquid is withdrawn from the tank through outlet 2 and intake connection 3 by means of a circulating pump 4 and returned to the tank through discharge connections 5 and 6 while chlorine is introduced into the discharge connections at junction 7 through connection 8 from the chlorine container 9. The chlorine may be introduced into the circulating stream of liquid as a liquid, or largely as a liquid, so that the heat of vaporization of the unvaporized chlorine is directly available for counteracting the heat liberated by the chlorination reaction. By providing discharge connections of appropriate length the vaporization and absorption of the chlorine may be substantially completed before the liquid is discharged into the tank or the discharge connection 6 may be arranged so that any unabsorbed chlorine is confined to the body of liquid in the tank. When the chlorination has proceeded to the desired degree, the supply of chlorine may be shut off and the chlorinated liquid may be withdrawn from the chlorinating tank and pumped to suitable storage tanks or to the place of use through connection 10 by opening valve 11 and closing either valve 12 or 13.

The operation of the apparatus illustrated in Fig. 2 is in general similar to that of the apparatus in Fig. 1, and in Fig. 2 the same parts appearing in Fig. 1 are designated by the same reference character with the letter "a" appended. In place of introducing the chlorine at the lower end of the vertical pipe on the discharge side of the pump in the apparatus illustrated in Fig. 1, the chlorine is introduced into the discharge connections at junction 7$^a$ just before the circulating liquid enters the baffle box 20. A number of baffles 21 are arranged in the baffle box to promote thorough intermixture and agitation of the liquid to be chlorinated and the chlorine, promoting the chlorination and preventing the escape of any unvaporized liquid chlorine through the discharge connection 6$^a$. In either form of apparatus, the absorption of chlorine may be promoted by partially closing valve 12 or valve 12$^a$. In the apparatus illustrated in Fig. 1, the chlorination is promoted by the pressure maintained at the point of chlorine introduction due to the column of liquid in connection 5, and in the apparatus illustrated in Fig. 2 the baffle box serves to promote the absorption of chlorine by the agitation effected therein.

To prevent the development of excessive pressures in the discharge connections, a by-pass connection is arranged between the circulating connections on the discharge and intake sides of the pump. In the apparatus illustrated, this by-pass connection is made up of two upwardly extending connections 14 and 15 communicating at their upper end through connection 16. The connection 14 rises from a junction 17 in the discharge connection 5, and the connection 15 rises from a junction 18 in the intake connection 3. The communicating connection 16 between the upwardly extending connections 14 and 15 is arranged at an elevation such that the head necessary to cause circulation through the by-pass is greater than the head normally required to cause discharge through connection 6 to the tank 1, and a vent 19 is arranged in the communicating connection 16 to prevent the by-pass connections from acting as a syphon. As a further precaution, the chlorine container may be arranged at a point above the level of the communicating connection 16.

In normal operation of either form of apparatus there is no flow through the by-pass. During the chlorination period the liquid is circulated from the chlorinating tank through the chlorinating connections and back to the chlorinating tank. When the chlorination is completed the liquid is then pumped to a suitable place of storage or use. Should the discharge connection become obstructed while the pump is in operation, however, flow will then take place through the by-pass before any pressure can be developed in the discharge connections sufficient to force the liquid through the chlorine connections to the chlorine container. For example, as compared to the operation of an apparatus where the by-pass is not provided should the operator wishing to stop the chlorination and to pump the chlorinated liquid to storage close the valve 12 while the pump was still in operation and before opening valve 11 the by-pass would relieve the excess pressure in the discharge connections and circulation would take place therethrough until the valve 11 was opened. Where the valve 12, or 12$^a$, is employed to increase the pressure in the discharge connections during the chlorination, the upper connection 16, or 16$^a$, of the by-pass is arranged at an elevation sufficient to prevent flow through the by-pass with normal pressure prevailing in the discharge connections but to prevent the development of pressure in excess of this normal pressure.

As an example of the operation of the invention, and the improved results secured, in an apparatus similar to that illustrated in Fig. 1 in which a circulating pump of 400 gallons per minute capacity was employed discharging through connections which included about 12 feet of 3 inch pipe beyond the point of introduction of chlorine, chlorine was introduced into milk of lime at rates of from 1500 to 1900 pounds of chlorine per hour without any unabsorbed chlorine appearing in the liquid discharged into the chlorinating tank. With the same apparatus, except that the chlorine was introduced into the intake connections of the pump, chlorine gas escaped from the discharge connections with the liquid undergoing chlorination whenever attempts were made to introduce the chlorine at rates greater than about 750 to 800 pounds of chlorine per hour. The high rates of chlorine absorption obtained in the apparatus of the present invention were secured without restricting the flow through the valve 12. By partially closing this valve, a greater rate of chlorine introduction can be maintained with respect to the volume of liquid circulated, but the total rate of chlorine introduction may in some cases be decreased due to decrease in the total volume of liquid circulated unless the power supplied to the circulating pump is increased.

The invention thus provides an operation having important advantages in increasing the rate at which chlorine can be introduced into liquids to be chlorinated, such as milk of lime for the production of bleach liquors and the like. It will also be apparent that the apparatus of the invention, including the means for preventing the development of excessive pressures in the discharge connections where chlorine is introduced into the connections on the discharge side of a circulating pump, has several important advantages and is particularly advantageous for carrying out the improved method of the invention. The operation of the by-pass connection is automatic and independent of the operator, and the by-pass is moreover inexpensive and extremely simple in both construction and operation.

While the invention has been described particularly in connection with an apparatus and operation in which the liquid being chlorinated was circulated and recirculated during chlorination, it will be apparent that the invention is useful in connection with operations where chlorine is mingled with a stream of liquid circulated by means of a pump but not recirculated. In apparatus for carrying out such an operation a by-pass can be arranged between the discharge and intake connections of the pump in much the same manner and with much the same advantages as have been described in connection with the particular apparatus illustrated. The invention likewise has been described particularly in conjunction with the use of liquid chlorine directly introduced as such, and in such operations it has peculiar advantages, but it is also useful particularly the apparatus of the invention, in connection with operations where chlorine is introduced as a gas into the circulating connections on the discharge side of a pump.

I claim:

A method of chlorinating liquids, comprising circulating a stream of the liquid to be chlorinated by means of a pump, restricting the flow of the stream of liquid on the discharge side of the pump whereby the pressure therein is increased, and introducing chlorine into the circulating liquid on the discharge side of the pump in the region of increased pressure.

In testimony whereof I affix my signature.

JAMES H. MacMAHON.